(12) United States Patent
Coles

(10) Patent No.: US 11,837,951 B2
(45) Date of Patent: Dec. 5, 2023

(54) SELF-OSCILLATING HIGH FREQUENCY CONVERTER WITH POWER FACTOR CORRECTION

(71) Applicant: NexGen Power Systems, Inc., Santa Clara, CA (US)

(72) Inventor: Charles Coles, Milpitas, CA (US)

(73) Assignee: Nexgen Power Systems, Inc., Santa Clara, CA (US)

( * ) Notice: Subject to any disclaimer, the term of this patent is extended or adjusted under 35 U.S.C. 154(b) by 232 days.

(21) Appl. No.: 17/498,426

(22) Filed: Oct. 11, 2021

(65) Prior Publication Data
US 2022/0149720 A1  May 12, 2022

Related U.S. Application Data

(60) Provisional application No. 63/091,457, filed on Oct. 14, 2020.

(51) Int. Cl.
| | |
|---|---|
| *H02M 1/42* | (2007.01) |
| *H05B 45/3725* | (2020.01) |
| *H02M 1/32* | (2007.01) |
| *H02M 1/00* | (2006.01) |

(52) U.S. Cl.
CPC ........... *H02M 1/42* (2013.01); *H02M 1/0009* (2021.05); *H02M 1/32* (2013.01); *H05B 45/3725* (2020.01)

(58) Field of Classification Search
CPC ........ H02M 1/42; H02M 1/0009; H02M 1/32; H05B 45/3725
See application file for complete search history.

(56) References Cited

U.S. PATENT DOCUMENTS

| | | | |
|---|---|---|---|
| 2010/0020578 A1* | 1/2010 | Ryu | H02M 3/3376 363/68 |
| 2010/0097828 A1* | 4/2010 | Chen | H02M 3/1584 363/72 |
| 2011/0292693 A1* | 12/2011 | Niijima | H02M 3/33507 363/21.17 |
| 2014/0092642 A1* | 4/2014 | Yoshinaga | H02M 3/156 363/84 |
| 2019/0052176 A1* | 2/2019 | Yabuzaki | H02M 1/32 |
| 2020/0106363 A1* | 4/2020 | Yoshizawa | H02M 3/33507 |

* cited by examiner

*Primary Examiner* — Rafael O De Leon Domenech
(74) *Attorney, Agent, or Firm* — Kilpatrick Townsend & Stockton LLP

(57) ABSTRACT

A self-oscillating converter includes a power transistor coupled to a primary winding for controlling current flow in the primary winding, and a turn-on circuit configured to turn on the power transistor for maintaining oscillation in the self-oscillating converter. The self-oscillating converter also includes a turn-off circuit configured to turn off the power transistor to maintain an on-time of the power transistor at a pre-set value for power factor correction, and modulate the on-time of the power transistor to regulate the output current in the load device.

20 Claims, 8 Drawing Sheets

SELF-OSCILLATING HIGH FREQUENCY CONVERTER WITH POWER FACTOR CORRECTION

CROSS-REFERENCES TO RELATED APPLICATIONS

This application claims the benefit of U.S. Provisional Application No. 63/091,457, filed on Oct. 14, 2020, the contents of which are hereby incorporated by reference in their entirety for all purposes.

BACKGROUND OF THE INVENTION

Conventional switching power converters with integrated circuit (IC)-based controllers can have a limited switching frequency range and require a start-up sequence on a line cycle-by-line cycle basis when powered through an AC triac phase-cut dimmer. Eliminating an IC-based controller can significantly decrease the converter start up time and expands the AC triac phase-cut dimming range. Self-oscillating converters, also referred to as ringing-chokes, without IC-based controllers can be used to avoid the above limitations.

Despite the progress made in the area of switching power converters, there is a need in the art for improved methods and systems related to switching power converters.

SUMMARY OF THE INVENTION

The present invention generally relates to the field of electronics, and more specifically to devices and methods for controlling a switching power converter. Embodiments of the invention provide self-oscillating, current regulating converters with power factor correction.

Embodiments of the present invention provide circuits and methods for driving a load device with a self-oscillating converter. The method enables a self-oscillating converter to provide power factor correction while regulating the load current accurately without the addition of an IC controller.

According to some embodiments of the invention, a self-oscillating converter includes a power transistor coupled to a primary winding for controlling current flow in the primary winding, and a turn-on circuit configured to turn on the power transistor for maintaining oscillation in the self-oscillating converter. The self-oscillating converter also includes a turn-off circuit configured to turn off the power transistor to maintain an on-time of the power transistor at a pre-set value for power factor correction, and modulate the on-time of the power transistor to regulate the output current in the load device.

According to some embodiments of the invention, a self-oscillating converter includes a primary winding for coupling to an input voltage and providing a regulated output voltage to a load device and a power transistor coupled to the primary winding for controlling current flow in the primary winding. The self-oscillating converter also includes a first auxiliary winding coupled to the primary winding for providing a turn-on signal to the power transistor for maintaining oscillation in the self-oscillating converter, and a second auxiliary winding coupled to the primary winding for providing a turn-off signal to the power transistor to maintain an on-time of the power transistor at a pre-set value for power factor correction. The self-oscillating converter also includes a sensing circuit for sensing an output current in the load device and providing a modulating signal to modulate the on-time of the power transistor to regulate the output current in the load device.

In some embodiments, the above converter also includes a turn-off circuit coupled between the second auxiliary winding and the power transistor and configured to provide the turn-off signal. The turn-off circuit comprises a ramp circuit coupled to the second auxiliary winding for providing the turn-off signal to the power transistor to maintain the on-time of the power transistor at the pre-set value.

In some embodiments, the ramp circuit in the turn-off circuit includes a first resistor and a charging capacitor coupled in series to the second auxiliary winding to provide a first charging current to maintain the on-time of the power transistor at the pre-set value.

In some embodiments, the modulating signal from the sensing circuit activates a second charging current to the ramp circuit to modulate the on-time of the power transistor to regulate the output current in the load device.

In some embodiments, the converter also includes a turn-on circuit coupled between the first auxiliary winding and the power transistor and configured to provide the turn-on signal, wherein the turn-on circuit comprises a first branch and a second branch connected in series, the first branch including a first resistor and a capacitor connected in series, and the second branch including a diode and a second resistor connected in series.

In some embodiments, the self-oscillating converter is a non-isolated Buck converter.

In some embodiments, the self-oscillating converter is a non-isolated Buck-Boost converter.

In some embodiments, the self-oscillating converter is an isolated switch mode power converter.

In some embodiments, the sensing circuit includes an error amplifier characterized by a bandwidth substantially lower than the frequency of the AC input voltage.

In some embodiments, the AC input voltage is a 60 Hz signal, and the bandwidth of the error amplifier is approximately 2 to 3 Hz.

In some embodiments, the load device includes a light-emitting diode (LED) device.

In some embodiments, the converter also includes an over-current protection circuit, wherein the over-current protection circuit is coupled between a gate node of the power transistor and a ground node.

In some embodiments, the power transistor comprises a JFET (Junction Field Effect Transistor).

In some embodiments, the power transistor comprises a gallium nitride (GaN) transistor.

According to some embodiments of the invention, a method for driving a load device with a self-oscillating converter includes coupling a primary winding of the self-oscillating converter to receive an AC input voltage and providing an output voltage to the load device, and controlling current flow in the primary winding using a power transistor coupled to the primary winding, The method also includes providing a turn-on signal to the power transistor for maintaining oscillation in the self-oscillating converter, using a first auxiliary winding coupled to the primary winding. The method also includes providing a turn-off signal to the power transistor to maintain an on-time of the power transistor at a pre-set value for power factor correction, using a second auxiliary winding coupled to the primary winding. The method further includes sensing a current in the load device and providing a modulating signal to modulate the on-time of the power transistor to regulate an output current in the load device, using a sensing circuit.

In some embodiments, the above method also includes providing the turn-off signal using a turn-off circuit coupled between the second auxiliary winding and the power transistor, wherein the turn-off circuit comprises a ramp circuit coupled to the second auxiliary winding for providing the turn-off signal to the power transistor to maintain the on-time of the power transistor at the pre-set value.

In some embodiments, the method also includes forming the ramp circuit in the turn-off circuit with a first resistor and a charging capacitor coupled in series to the second auxiliary winding to provide a first charging current to maintain the on-time of the power transistor at the pre-set value.

In some embodiments, the method also includes using the modulating signal from the sensing circuit to activate a second charging current to the ramp circuit to modulate the on-time of the power transistor to regulate the output current in the load device.

In some embodiments, the method also includes providing the turn-on signal using a turn-on circuit coupled between the first auxiliary winding and the power transistor and configured to provide the turn-on signal, wherein the turn-on circuit comprises a first branch and a second branch connected in series, the first branch including a first resistor and a capacitor connected in series, and the second branch including a diode and a second resistor connected in series.

In some embodiments, the sensing circuit includes an error amplifier characterized by a bandwidth substantially lower than the frequency of the input voltage.

In some embodiments, the method also includes configuring the self-oscillating converter as a non-isolated Buck converter.

In some embodiments, the method also includes configuring the self-oscillating converter as a non-isolated Buck-Boost converter.

In some embodiments, further comprising configuring the self-oscillating converter is an isolated switch mode power converter.

In some embodiments, the power transistor comprises a gallium nitride (GaN) JFET (Junction Field Effect Transistor).

In some embodiments, the load device comprises an LED (light-emitting diode) device.

In a particular embodiment, a self-oscillating converter is provided. The self-oscillating converter includes a power transistor coupled to a primary winding for controlling current flow in the primary winding and a turn-on circuit configured to turn on the power transistor for maintaining oscillation in the self-oscillating converter. The self-oscillating converter also includes a turn-off circuit configured to turn off the power transistor in order to maintain an on-time of the power transistor at a pre-set value for power factor correction and modulate the on-time of the power transistor to regulate an output current in a load device.

In some embodiments, the self-oscillating converter additionally includes a second auxiliary winding. In these embodiments, the turn-off circuit is coupled between the second auxiliary winding and the power transistor and the turn-off circuit comprises a ramp circuit coupled to the second auxiliary winding and configured to maintain the on-time of the power transistor at the pre-set value. The ramp circuit in the turn-off circuit can include a first resistor and a charging capacitor coupled in series to the second auxiliary winding to provide a first charging current to maintain the on-time of the power transistor at the pre-set value. In a particular embodiment, the self-oscillating converter further includes a first auxiliary winding, the turn-on circuit is coupled between the first auxiliary winding and the power transistor and is configured to provide a turn-on signal, and the turn-on circuit comprises a first branch and a second branch connected in series, the first branch including a first resistor and a capacitor connected in series, and the second branch including a diode and a second resistor connected in series. The self-oscillating converter can be a non-isolated Buck converter or a non-isolated Buck-Boost converter. The self-oscillating converter can be an isolated switch mode power converter. In an embodiment, the self-oscillating converter also includes a sensing circuit including an error amplifier characterized by a bandwidth substantially lower than a frequency of an AC input voltage. The AC input voltage can be a 60 Hz signal and the bandwidth of the error amplifier can be approximately 2 to 3 Hz. In a specific embodiment, the self-oscillating converter further includes an over-current protection circuit coupled between a gate node of the power transistor and a ground node. The load device can include a light-emitting diode (LED) device. The power transistor can be a JFET (Junction Field Effect Transistor) or a gallium nitride (GaN) transistor.

Numerous benefits are achieved by way of the present disclosure over conventional techniques. For example, embodiments of the present disclosure provide one or more of cost reduction through the elimination of an IC-based modulator, reduced start up time and improved triac-based phase cut dimming range capability, increased switching frequency that is not limited by an IC controller, and smaller transformer size, and the like. The high switching frequency also reduces the inductor and EMI (electro-magnetic interference) filter size. Also, while in some cases the variable switching frequency may not be desired, in other cases it may be advantageous due to the spreading of the energy over a band of frequencies, reducing the peak energy seen at any one specific frequency.

These and other embodiments of the disclosure, along with many of its advantages and features, are described in more detail in conjunction with the text below and corresponding figures.

DETAILED DESCRIPTION OF THE INVENTION

Figure 1:
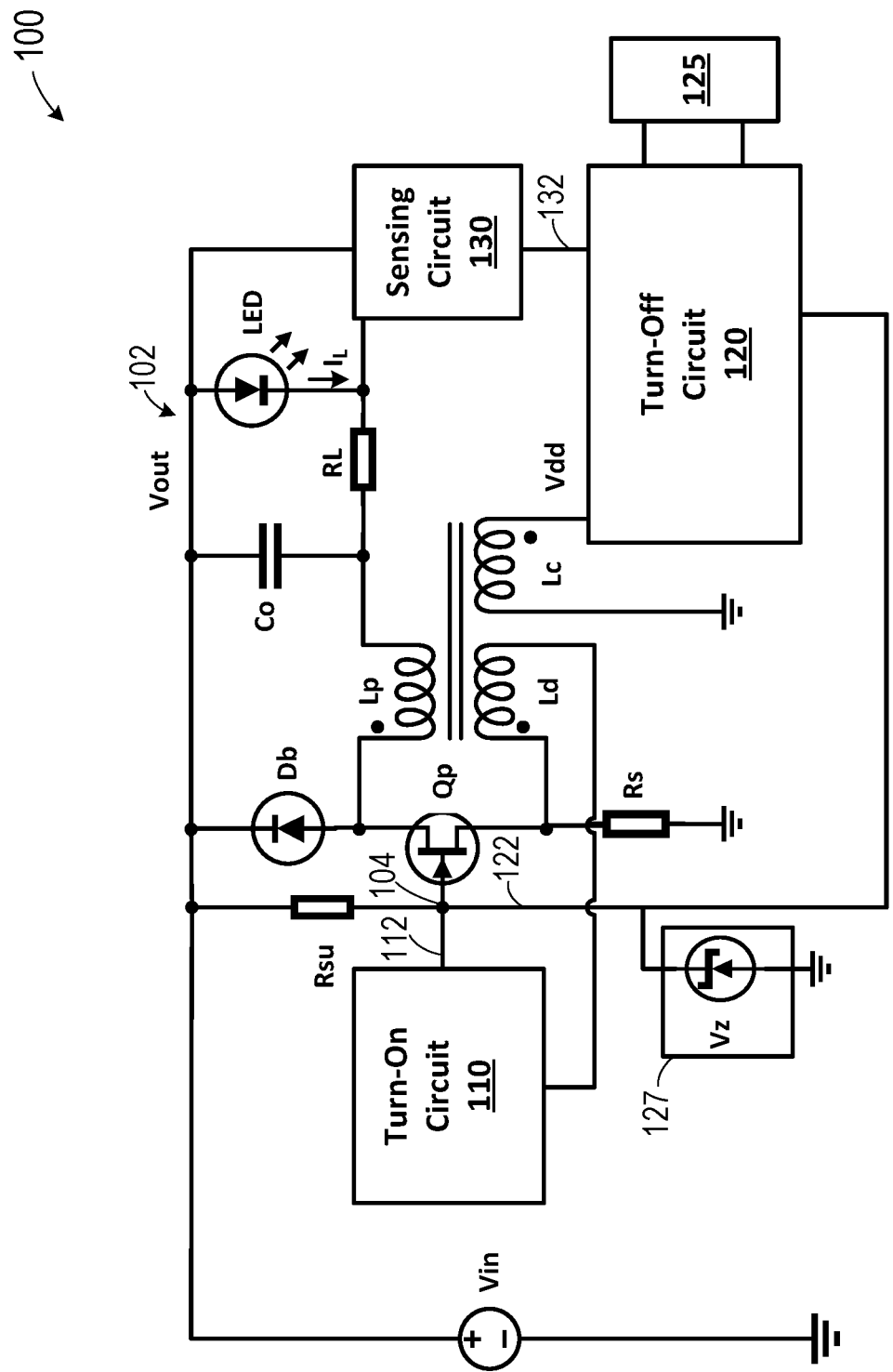
FIG. 1 is a simplified block diagram illustrating a self-oscillating converter according to some embodiments of the present invention.

Conventional self-oscillating converters are characterized by many limitations. For example, ringing chokes have been commonly used in low-cost AC-DC Flyback converters with Bipolar or MOSFET power switches to regulate output voltages. In an example, a ringing choke designs operate on the CCM/DCM border (CrM) and use the reset of the Flyback winding to sense when the load winding current has decayed to zero and initiate the subsequent switching cycle. The converter switches at a frequency determined by the time required for the inductor current to decay to zero during the off-time of the main power transistor and the modulated on-time.

The ringing choke flyback inductor is energized during the on-time, and during the off-time, the energy stored in the inductor is transferred to the load and output capacitor. Once the energy transfer is complete, the transformer auxiliary winding reflects the reset of the primary winding and is used to turn on the power transistor and begin the next switching cycle. This is a variable switching frequency solution. The off-time is dictated by the time required to discharge all energy from the inductor and reset the core. The isolated output voltage of the power supply can be sensed via a secondary referenced three terminal reference, which is used to drive an opto-isolator which modulates the power transistor on-time, its peak current, and the cycle-by-cycle energy stored in the flyback transformer. Drawbacks of the self-resonant converter include the fact that, since it is operating at the CCM/DCM boarder, the peak current for a given load current therefore will be higher than if operating in CCM. But, the soft switching characteristics of the self-resonant converter can offset the additional losses associated with the higher peak current seen in CrCM. Another potential drawback is that the switching frequency is variable. In some applications, a fixed switching frequency may be desired to more easily control the EMI.

Ringing chokes can also be used to regulate LED current. In another example of a conventional design, a ringing choke LED driver sets the on-time by way of the peak primary current that is sensed at the source of the power transistor. The sensed current is summed with the feedback error amplifier output to set the on-time required to meet the load current demand and properly regulate the output voltage. The peak current mode control exhibits peak to average current sensing errors with the regulation error on the order of 2:1 over the line variation, not nearly enough to meet the typical tolerance requirement of an LED lamp. There is also no power factor correction associated with this design.

Some embodiments of the present invention improve the performance of a ringing choke-based LED driver by using constant on-time modulation, while regulating the LED current via a low bandwidth error amplifier. This design can accurately regulate the load current while maintaining high power factor (PF) performance.

FIG. 1 is a simplified block diagram illustrating a self-oscillating converter according to some embodiments of the present invention. As shown in FIG. 1, self-oscillating converter 100 includes a primary winding Lp for coupling to an input voltage Vin and providing a regulated output voltage Vout to a load device 102, and a power transistor Qp coupled to the primary winding Lp for controlling current flow in the primary winding Lp and power transistor Qp. Self-oscillating converter 100 also includes a first auxiliary winding Ld coupled to the primary winding Lp for providing a turn-on signal 112 to the power transistor Qp for maintaining oscillation in the self-oscillating converter 100. Self-oscillating converter 100 also includes a second auxiliary winding Lc coupled to the primary winding Lp for providing a turn-off signal 122 to the power transistor to maintain an on-time of the power transistor Qp at a pre-set value for power factor correction. Self-oscillating converter 100 further includes a sensing circuit 130 for sensing an output current $I_L$ in the load device and providing a modulating signal 132 to modulate the on-time of the power transistor Qp to regulate the output current $I_L$ in the load device. In some embodiments, sensing circuit 130 can also be configured for sensing the output voltage in the load device and providing a modulating signal 132 to modulate the on-time of the power transistor Qp to regulate the output voltage $I_L$ in the load device.

Self-oscillating converter 100 also includes a turn-on circuit 110 coupled between the first auxiliary winding Ld and the power transistor Qp and configured to provide the turn-on signal 112. Self-oscillating converter 100 also includes turn-off circuit 120 coupled between the second auxiliary winding Lc and the power transistor Qp and configured to provide the turn-off signal 122.

In the example of FIG. 1, self-oscillating converter 100 is configured as a non-isolated Buck converter, also known as a step-down converter. As shown in FIG. 1, input voltage Vin, power transistor Qp, diode Db, and primary winding Lp are configured to provide output voltage Vout across output capacitor Co. Resistor RL represents the load resistance of load device 102. In the example of FIG. 1, the load device 102 is an LED device. As described below, resistor RL can be used as a current sensing resistor. An LED device can include a single LED diode, a string of LED diodes, or multiple strings of LED diodes, or the like. In some embodiments, the output capacitor can be coupled in parallel with the LED device after the current sense resistor RL.

As shown in FIG. 1, self-oscillating converter 100 also includes a startup resistor Rsu coupled to a gate node 104 of power transistor Qp, Self-oscillating converter 100 also includes an over-voltage protection circuit 125 and an over-current protection circuit 127. In the embodiment illustrated FIG. 1, over-current protection circuit 127 includes a Zener diode Vz. The operations of over-voltage protection circuit 125 and over-current protection circuit 127 are described in more detail below.

Figure 2:
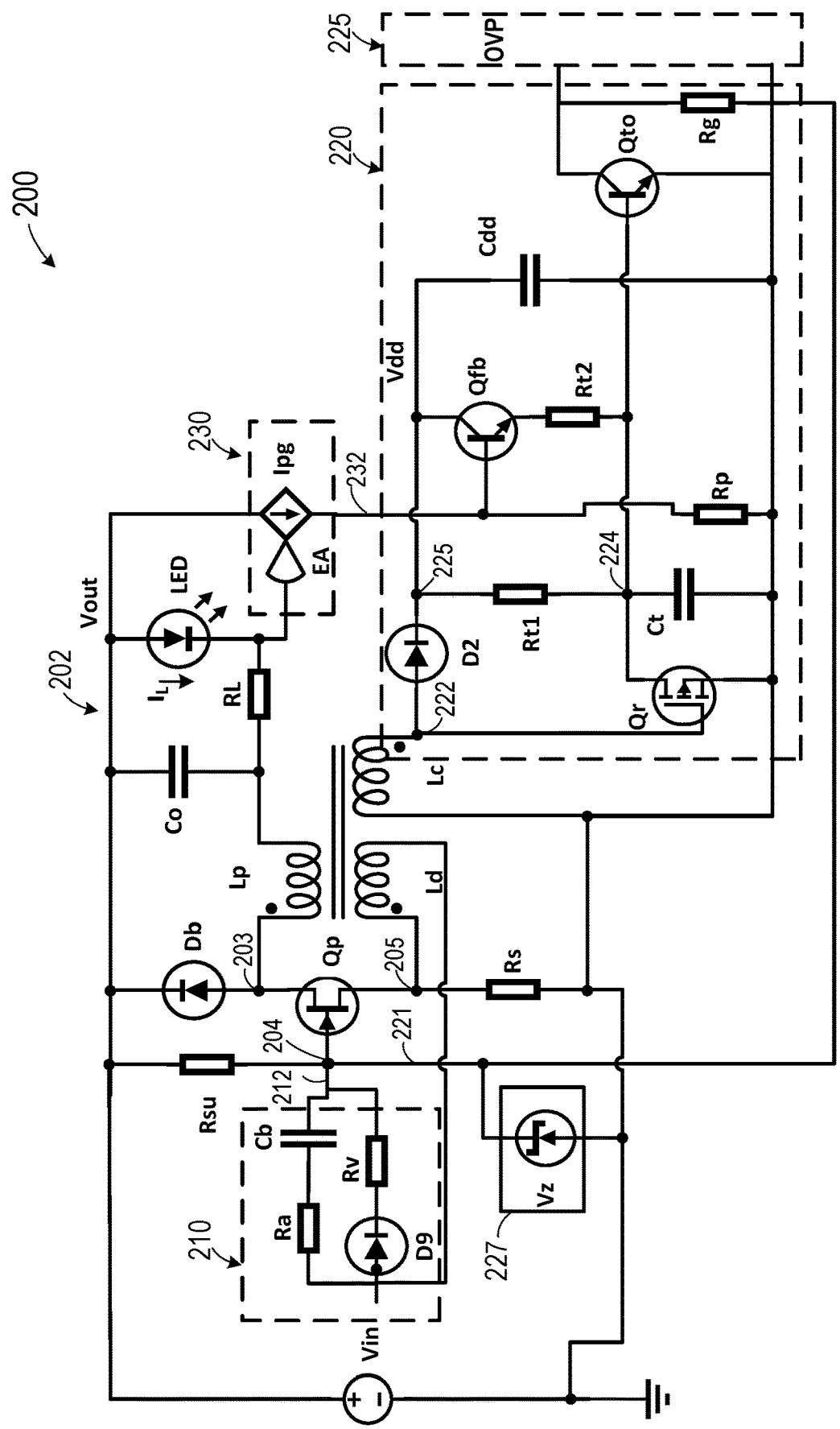
FIG. 2 is a simplified schematic diagram illustrating a self-oscillating converter according to some embodiments of the present invention.

FIG. 2 is a simplified schematic diagram illustrating a self-oscillating converter according to some embodiments of the present invention. As shown in FIG. 2, self-oscillating converter 200 is similar to self-oscillating converter 100 of FIG. 1, and provides implementation examples of the turn-on circuit, the turn-off circuit, and the sensing circuit referred to in FIG. 1. Thus, the description provided in relation to FIG. 1 is applicable to FIG. 2 as appropriate. One of ordinary skill in the art would recognize many variations, modifications, and alternatives.

As shown in FIG. 2, self-oscillating converter 200 includes a primary winding Lp for coupling to an input voltage Vin and providing a regulated output voltage Vout to a load device 102, and a power transistor Qp coupled to the primary winding Lp for controlling current flow in the primary winding Lp and power transistor Qp. Self-oscillating converter 200 also includes a first auxiliary winding Ld coupled to the primary winding Lp for providing a turn-on signal 212 to the power transistor Qp for maintaining oscillation in the self-oscillating converter 200. Self-oscillating converter 200 also includes a second auxiliary winding Lc coupled to the primary winding Lp for providing a turn-off signal 221 to the power transistor to maintain an on-time of the power transistor Qp at a pre-set value for power factor correction. Self-oscillating converter 200 also includes an over-voltage protection circuit 225 to protect the converter in the event that the LED load becomes open. Self-oscillating converter 200 further includes a sensing circuit 230 for sensing an output current $I_L$ in the load device and providing a modulating signal 232 to modulate the on-time of the power transistor Qp to regulate the output current $I_L$ in the load device.

The primary winding Lp inductor value sets the switching frequency. The inductor value for Lp is selected, for example, based on the input voltage, output voltage, desired switching frequency, and load current.

Self-oscillating converter 200 also includes a turn-on circuit 210 coupled between the first auxiliary winding Ld and the power transistor Qp. The turn-on circuit 210 is configured to provide the turn-on signal 212. Self-oscillating converter 200 also includes turn-off circuit 220 coupled between the second auxiliary winding Lc and the power transistor Qp. The turn-off circuit 220 is configured to provide the turn-off signal 221.

Self-oscillating converter 200 is a Buck converter, similar to self-oscillating converter 100 of FIG. 1 and shares many common components with self-oscillating converter 100 illustrated in FIG. 1. Therefore, functions and operations of common components in FIG. 2 are not described in detail.

Self-oscillating converter 100 of FIG. 1 and self-oscillating converter 200 of FIG. 2 are configured to provide power factor correction and output current regulation. In some embodiments, the power factor correction is provided by maintaining the on-time at a pre-set value. The output current regulation is provided by modulation of the on-time with the sensing circuit.

Constant on-time modulation can be used with many topologies to achieve unity power factor. The modulation adjusts the on-time over a line frequency cycle, thus achieving a peak current that is proportional to the input voltage Vin. The primary current Ip can be expressed as a function of input voltage Vin, primary current on-time ton, and the inductance of the primary winding Lpri, $Ip=Vin*ton/Lpri.$ If ton is fixed (throughout a line voltage cycle), the peak and subsequently average input current then spreads out over the input voltage line cycle, increasing the power factor of the converter, typically 0.95 to 0.97. This makes the input impedance appear more resistive and reduces reactive currents and improves the power factor of the power supply. According to embodiments of the present invention, the constant on time fixes the time that the power inductor is charged at a constant value throughout the line cycle. The peak current then tracks the AC input voltage. That is, at the peak of the line, the peak current is higher than at the valley of the line.

In self-oscillating converter 100 of FIG. 1, the on-time is controlled by turn-on circuit 110 and turn-off circuit 120. Similarly, in self-oscillating converter 200 illustrated in FIG. 2, the on-time is controlled by turn-on circuit 210 and turn-off circuit 220.

The turn-on circuit and turn-off circuit are designed to drive the power transistor. In the self-oscillating converter examples of FIG. 2, power transistor Qp is an enhancement mode junction field effect transistor (JFET), which is driven by a gate current. Therefore, turn-on circuit 210 and turn-off circuit 220 are designed accordingly. In other embodiments, the power transistor can be implemented using other types of transistors, such as MOSFETs, bipolar transistors, or the like. In these cases, the turn-on circuit and the turn-off circuit will be designed accordingly. In some embodiments, power transistor Qp can be a gallium nitride (GaN) JFET. In other embodiments, transistors based on other semiconductor materials, such as silicon, can also be used.

As shown in FIG. 2, turn-on circuit 210 includes a first branch and a second branch connected in parallel, the first branch including a first resistor Ra and a charging capacitor Cb connected in series, and the second branch including a diode D9 and a second resistor Rv connected in series. Turn-on circuit 210 is coupled between the first auxiliary winding Ld and the power transistor Qp and configured to provide the turn-on signal 212. The values of resistor Ra and charging capacitor Cb are chosen to provide a high current path to turn on power transistor Qp quickly. After turn-on, the gate-to-source voltage of Qp, which is a GaN JFET in the illustrated embodiment, will clamp the forward voltage at the PN junction voltage, for example, 3.6V. In some examples, the resistance value of Ra can be on the order of tens of ohms or less. For example, Ra could vary from as low as 1 to 2 Ohms to 40 to 50 Ohms depending on switching speed required, EMI considerations, and losses, etc. If the primary winding Lp voltage is 10V peak-to-peak, the gate voltage of Qp is clamped at 3.6V, and the rest of the voltage charges up across charging capacitor Cb, and, subsequently, no more current will flow through the gate to the source. Cb typically ranges from 1 nF to 10 nF for typical JFET enhancement-mode Gallium Nitride devices. The resistance value of Rv can be a few thousand ohms, for example, 2.2K to limit the current flow through the gate to the source at the JFET to a small current.

In embodiments in which power transistor Qp is a GaN JFET, self-oscillating converter 200 can operate at a switching frequency in the range of, for example, 500 KHz to 2 MHz. Operating at these high switching frequencies provides many advantages. For example, the size of EMI (electro-magnetic interference) filters and the size of the magnetics can be smaller for converters operating at these high switching frequencies.

In FIG. 2, turn-off circuit 220 is coupled between the second auxiliary winding Lc and the power transistor Qp and configured to provide the turn-off signal 221. Turn-off circuit 220 includes a ramp circuit, formed by a timing resistor Rt1 and an on-time capacitor Ct, being charged by the voltage Vdd provided by the second auxiliary winding. When capacitor Ct is charged to a threshold voltage of transistor Qto, transistor Qto is turned on and activates the turn-off signal 221 to pull down the gate node 204 of power transistor Qp to turn it off.

The second auxiliary winding Lc functions as a bias/control winding. It is rectified during the off-time of the primary winding Lp and reflects the LED diode voltage divided by the ratio of the second auxiliary winding (Lc) turns to the primary winding (Lp) turns. The rectified bias Vdd is an integer fraction of the regulated LED voltage Vout, Vdd=Vout/n, where n is the turns ratio between the primary winding Lp and the second auxiliary winding Lc. As an example, if the Ldd voltage Vout is 50 V and the turns ratio n is 10, then, the bias voltage Vdd will be 5V. This provides a constant, loosely regulated voltage that is used to charge the on-time capacitor Ct through the timing resistor Rt1. The bias voltage Vdd charges capacitor Ct until the base voltage Vbe of transistor Qto reaches the threshold voltage and turns on Qto, which will pull down the voltage at the gate node 204 of power transistor and turn off power transistor Qp. Given the constant voltage Vdd, the on-time capacitor Ct is charged consistently with a fixed on-time determined by Rt1 and Ct with respect to the input voltage Vin during the AC line voltage cycle. In each control cycle, the power transistor is turned off after the constant on-time, which causes the output current to follow the input voltage and provide power factor correction. Once the current in the primary winding Lp of the transformer decays to zero, the voltage on the primary winding Lp reverses polarity, which is reflected on the first auxiliary winding Ld and causes power transistor Qp to turn on again to start the next control cycle.

The second auxiliary winding Lc also initiates the Ct charge at the instant the power transistor Qp turns on. During the off-time, the second auxiliary winding Lc enables a switch (Qr) that discharges the on-time capacitor Ct. At turn on, the second auxiliary winding Lc disables switch Qr, allowing the on-time capacitor Ct to begin charging. Once the voltage on Ct at node 224 exceeds the transistor (Qto) turn-on threshold, the power transistor Qp on-time is terminated. The pre-set value for the on-time can be determined from the charging time for the voltage on charging capacitor Ct to reach the threshold voltage of transistor Qto. Therefore, the pre-set value for the on-time can be selected based on, for example, the value of Vdd, the threshold voltage of transistor Qto, the resistance value of resistor Rt1, and the capacitance value of capacitor Ct.

Self-oscillating converter 200 further includes a sensing circuit 230 that includes an error amplifier EA and a current source Ipg, which can be considered as a programming current source since it is used, as described herein, to program the constant on-time. Error amplifier EA is a high-gain, low-bandwidth amplifier, which senses the LED DC current via RL. The error amplifier EA is characterized by a bandwidth substantially lower than the frequency of the AC input voltage. For example, the AC input voltage can be a 60 Hz signal, and the bandwidth of the error amplifier can be approximately 2 to 3 Hz.

In an open-loop example without the feedback control provided by error amplifier EA and programmable current source Ipg, the power transistor Qp on-time is fixed, as determined by the values of Vdd, Rt1, Ct, and the threshold voltage of transistor Qto. This fixed on-time would be the maximum on-time, providing the maximum load current to the LED. The on-time can be reduced by the feedback control provided by error amplifier EA and current source Ipg can provide an additional charging current to Ct through transistor Qfb and resistor RT2. The reduced on-time can lead to reduced LED load current.

The error amplifier EA compares the LED current with a target current represented by a reference voltage, which is a fixed voltage with a low-temperature coefficient. The error amplifier EA senses the LED current by measuring the voltage dropped across RL (equal to RL times IL) against the reference voltage. If the measured voltage is higher than the reference voltage, indicating that the LED current is higher than the target current, the error amplifier turns on the current source Ipg to provide the additional Ct charging current through resistor Rt2 to reduce the on-time of power transistor Qp, thereby reduce the LED current. In this manner, the LED current can be regulated. Thus, when the current (corresponding to the voltage drop) exceeds the reference voltage, EA turns on current source Ipg, resulting in a current flow through Rp. The current flow through Rp will result in a voltage at the base of transistor Qfb. When transistor Qfb turns on as a result of the base voltage, current will flow through Rt2, charging capacitor Ct more quickly than if it were charged only by current flowing through Rt1 alone. Thus, the constant on-time can be modulated, in this example, decreased toward a minimum value as a result of the sensing of the current load.

In an embodiment, EA and Ipg can be selected to cause the on-time to increase or decrease, thereby raising or lowering the LED current. Current Ipg flowing through resistor Rp provides a bias voltage at the base of transistor Qfb. The magnitude of Ipg is varied based on the output of error amplifier EA. For example, in some embodiments, current source Ipg can be a voltage-controlled current source. The range of the magnitude of Ipg and the resistance value of Rp can be selected such that transistor Qfb is biased near a mid-point of the range of Ipg, allowing Ipg to both increase and decrease. When the maximum on-time is desired, the Ipg flowing through Rp biases the base of transistor Qfb below its threshold voltage, such that no charging current is provided by the current path through Rt2. In this case, Ct is charged by only Rt1 connected to Vdd. When the minimum on-time is desired, the Ipg flowing through Rp biases the base of transistor Qfb to fully turn on in saturation, such that Rt2 is driven by Vdd. In this case, Ct is charged by the parallel combination of Rt1 and Rt2, both connected to Vdd.

Turn-off circuit 220 also includes a second resistor (Rt2) that connects Ct to a voltage that is modulated from zero to Vdd by way of the LED current error amplifier EA and current source Ipg. This modulates the on-time ton of power transistor Qp of the converter from a maximum to a minimum level via current source Ipg, resistor Rp, switch Qfb, and resistor Rt2. Thus, the constant on-time can be modulated based on the load current demand. As described herein, the maximum on-time is determined by Rt1 charging Ct, and the minimum on time is determined by Rt1 in parallel with Rt2 charging Ct. In other words, the feedback circuit modulates the voltage feeding Rt2 from zero to Vdd. Accordingly, the maximum charge current of Ct is driven by the parallel combination of Rt1 and Rt2 connected to Vdd. The minimum charge current is driven by only Rt1. Accordingly, by sensing the LED current, the fixed on-time can be modulated with an amplifier EA and a current source Ipg based on the load current demand.

The behavior of the circuit illustrated in FIG. 2, which utilized a feedback loop to modulate the constant on-time, can be contrasted with a circuit operating in an open loop configuration. In an open loop configuration in which no current flows through Ipg, the on-time would be fixed by Rt1 and Ct, whereas, in the embodiment illustrated in FIG. 2, the on-time can be modulated between a maximum on-time determined by Rt1 and Ct and a minimum on-time determined by Rt1 in parallel with Rt2 and Ct.

Figure 4:
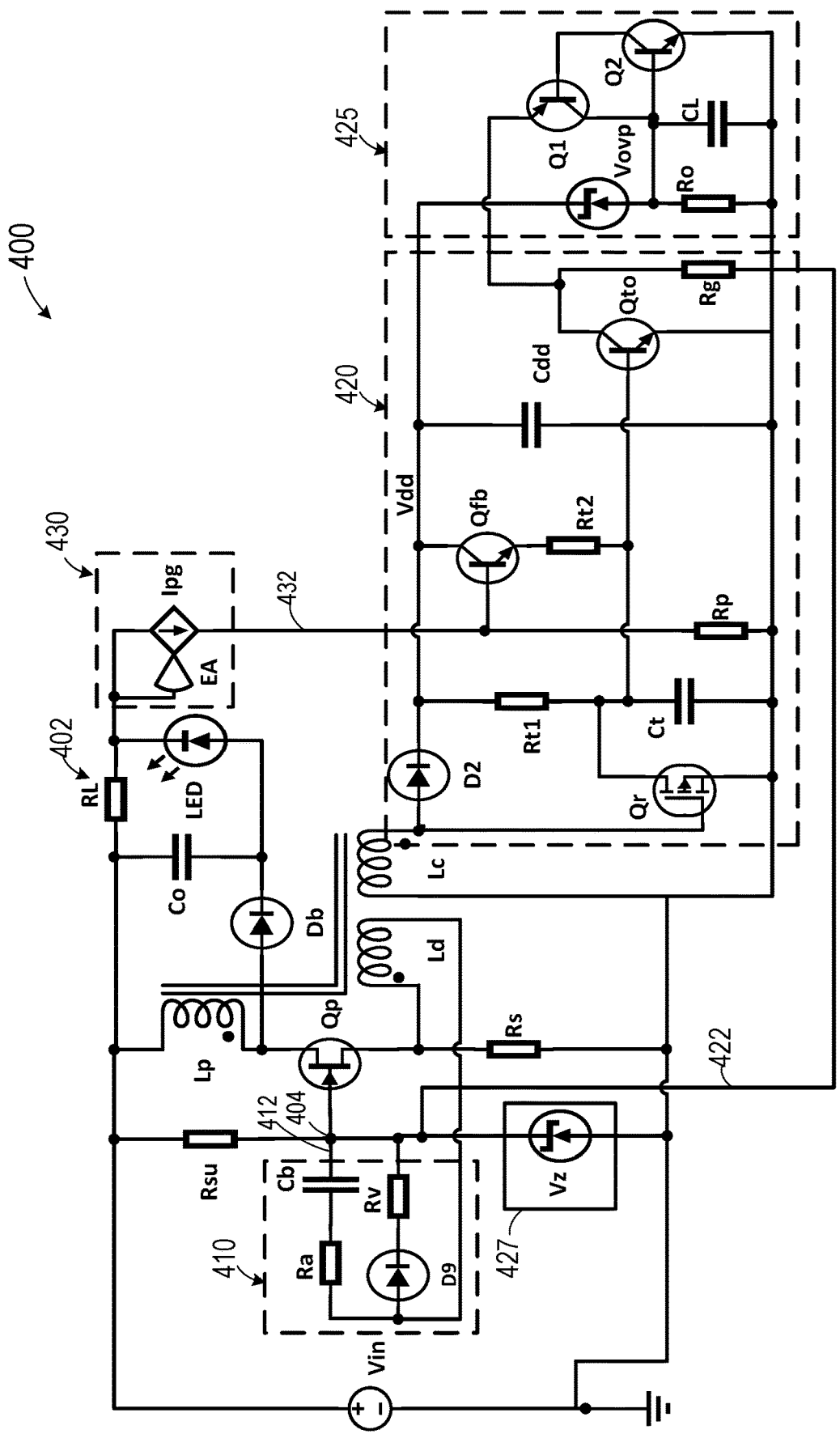
FIG. 4 is a simplified schematic diagram illustrating another self-oscillating converter according to some embodiments of the present invention.

Self-oscillating converter 200 can also include an over-voltage protection (OVP) circuit 225 similar to over-voltage protection circuit 125 in FIG. 1. Since the second auxiliary winding Lc winding reflects the LED voltage during the off-time, it can also be used to latch off the power transistor in the event of an open LED creating an over-voltage condition at the output. A circuit example of an over-voltage protection circuit 425 is shown in FIG. 4.

Self-oscillating converter 200 also includes a series resistor Rs coupled to the source of power transistor Qp. In the case that the turn-off circuit 220 does not turn off Qp, the series resistor Rs will ultimately decrease the gate-to-source voltage (Vgs) of Qp and turn off the transistor, effectively providing a pulse-by-pulse current limit protection.

Self-oscillating converter 200 includes a start-up resistor Rsu coupled between the input voltage Vin and the gate node 204 of power transistor Q4. At start-up, the start-up resistor Rsu charges the gate of the power transistor Q4 to the on voltage. Diode D9 blocks the drive winding from diverting start-up current delivered through Rsu. The start-up circuit makes for a very fast start-up time when compared with typical IC controllers. In typical triac based phase cut dimming circuits, the start-up time is critical as start-up can occur on a line cycle-by-line cycle basis. The fast start-up time achievable with this circuit can simplify the task of designing for a wide diming range using phase cut diming.

Figure 3:
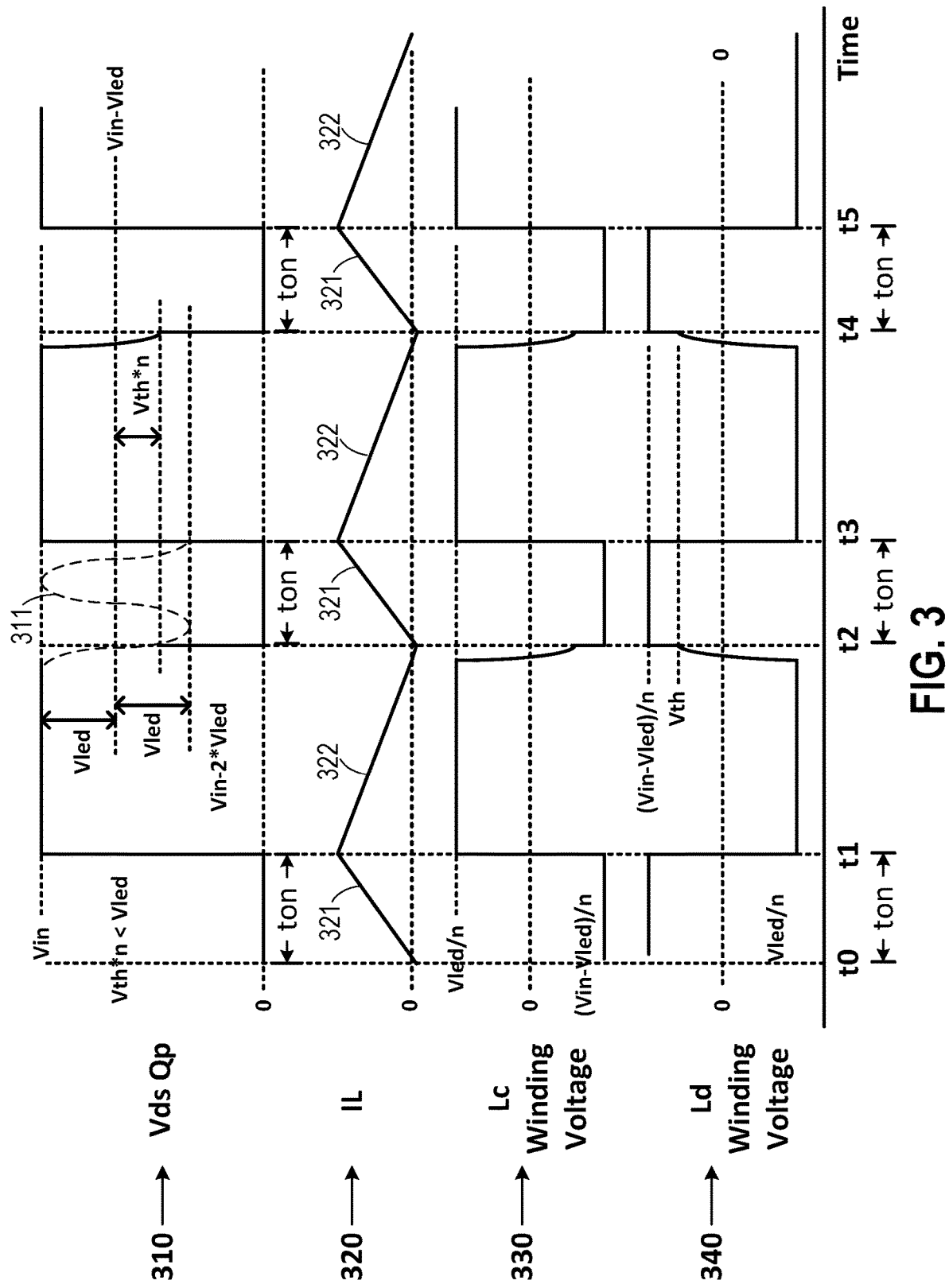
FIG. 3 is a simplified waveform diagram illustrating waveforms of various signals in the operation of self-oscillating converter 200 according to embodiments of the present invention.

FIG. 3 is a simplified waveform diagram illustrating waveforms of various signals in the operation of self-oscillating converter 200 according to embodiments of the present invention. Thus, the operation of self-oscillating converter 200 can be described with reference to FIG. 3. In FIG. 3, the vertical axis shows various voltages in the converter as functions of time, which is plotted in the horizontal axis. Waveform 310, labeled Vds Qp, illustrates the drain-source voltage Vds at the drain node 203 of power transistor Qp; waveform 320, labeled IL, illustrates the current in the primary winding Lp and power transistor Qp; waveform 330, labeled Lc Winding Voltage, illustrates the voltage at node 222 in FIG. 2 across the second auxiliary winding Lc, also referred to as the bias/control winding; and waveform 340, labeled Ld Winding Voltage, illustrates the voltage at node 205 in FIG. 2 across the first auxiliary winding Ld, also referred to as the drive winding, which is used to drive the gate of power transistor Qp.

In FIG. 3, at time t0, the power transistor Qp is turned on, its drain-source voltage Vds Qp is low as shown in waveform 310, the current IL in the primary winding Lp is 0, the Lc winding voltage Lc Winding Voltage is at negative (Vin−Vled)/n, and the Ld winding voltage (see waveform 340) is at positive (Vin−Vled)/n, where n is the turns ratio between Lp and Lc, and is also the turn ratio between Lp and Ld in this example. The polarities of voltages Lc Winding Voltage and Ld Winding Voltage are due to the winding coupling polarities, as noted by the black dots associated with windings Lp, Lc, and Ld.

Between time t0 and time t1, power transistor Qp is on, as noted as ton in FIG. 3. At time t1, power transistor Qp is turned off. The control cycle repeats from time t2 to time t4, etc. Thus, the on-time ton is associated with the time period between t0 and t1, the time period between t2 and t3, and the time period between t4 and t5.

Between time t0 and time t1, the current 321 in the primary winding Lp ramps up. At time t1, power transistor Qp is turned off, and the drain voltage Vds Qp of power transistor Qp is at Vin. Current IL reaches a leak value. It is noted that the LED current is the average of current IL. The voltage in Lc winding voltage (see waveform 330) is at Vled/n as determined by voltage at the primary winding Lp and the turn ratio n between Lp and Lc. The Ld winding voltage (see waveform 340) drops to negative Vled/n, as determined by voltage at the primary winding Lp, the turn ratio n between Lp and Ld, and the coupling polarity between Lp and Ld.

At time t1, the power transistor Qp is turned off. The inductor current 322 in primary winding Lp continues to flow to charge up the output capacitance, also known as Coss, of Qp and causes the drain-source voltage Vds Qp of power transistor Qp at drain node 203 to be Vin. At this point, the voltage across the primary winding is clamped at the LED voltage Vled. The winding current IL (see waveform 320), which represents the current in the primary winding LP, reverses polarity and starts to ramp down. When current IL approaches 0, a resonant circuit formed by inductor Lp starts to resonate with the capacitance at the drain node 203. A ringing waveform 311 is started in waveform 310. If the power transistor Qp is not turned back on, the ringing waveform 311 would continue, as shown by the broken line, until the stored energy is dissipated through resistive losses. The magnitude of the ringing waveform would vary from Vin−2*Vled to Vin, with the voltage swing of Vled centered around Vin−Vled. However, as the voltage represented by waveform 310 falls below Vin−Vled by the amount Vth*n, the voltage Ld Winding Voltage induced on the first auxiliary winding, or gate drive winding, Ld reaches Vth, the threshold voltage of power transistor Qp. Power transistor Qp is turned on, at time t2, to start the next cycle.

At time t2, the power transistor Qp is turned on again to start the next cycle. The first auxiliary winding Ld turns on the power transistor Qp through turn-on circuit 210 upon reset of the primary winding Lp. Turn-on initiates when the primary winding current reaches zero, at time t2. At this point, the primary winding resonates with the switch node capacitance. If there was no gate drive winding Ld, the voltage at the drain of the power transistor Qp would resonate from Vin to Vin−2*Vout, once the primary winding current has reached zero, resulting in the ringing waveform 311 (assuming no reverse recovery charge associated with the free-wheeling diode). With the first auxiliary winding Ld (the gate drive winding), the power transistor is enabled as soon as the first auxiliary winding Ld voltage exceeds the turn-on voltage Vth of the power transistor. The first auxiliary winding turns ratio is selected so that the transistor threshold voltage is exceeded and is enabled prior to the drain voltage resonating to Vin−2*Vout as seen in FIG. 3.

In FIG. 3, the second control cycle lasts between time t2 and time t4. The operation of self-oscillating converter 200 in the control cycle of t2 to t4 is similar to the operation in the control cycle of t0 to t2. From time t2 to time t3, power transistor Qp is turned on. At time t2, the power transistor Qp is turned on, its drain-source voltage Vds Qp is low, the current IL in the primary winding Lp is 0, the Lc winding voltage (see waveform 330) is at negative (Vin−Vled)/n, and the Ld winding voltage (see waveform 340) is at positive (Vin−Vled)/n, where n is the turns ratio between Lp and Lc, and is also the turn ratio between Lp and Ld in this example. The on-time, ton, between time t2 and time t3 is controlled by the turn-off circuit 220 of FIG. 2 as described above.

At time t3, the power transistor Qp is turned off. The inductor current IL in primary winding Lp continues to flow to charge up the output capacitance, also known as Coss, of Qp and causes the drain-source voltage Vds Qp of power transistor Qp at drain node 203 to be Vin. At this point, the voltage across the primary winding is clamped at the LED voltage Vled. The winding current IL (see waveform 320), which represents the current in the primary winding LP, reverses polarity and starts to ramp down. When current IL approaches 0, a resonant circuit is formed by inductor Lp starts to resonate with the capacitance at the drain node 203. A ringing waveform 311 is started in waveform 310. If the power transistor Qp is not turned back on, the ringing waveform 311 would continue, as shown by the broken line, until the stored energy is dissipated through resistive losses. The magnitude of the ringing waveform would vary from Vin−2*Vled to Vin, with voltage swing of Vled centered around Vin−Vled. However, as voltage Vds Qp falls below Vin−Vled by the amount Vth*n, the voltage Ld Winding Voltage induced on the first auxiliary winding, or gate drive winding, Ld reaches Vth, the threshold voltage of power transistor Qp. Power transistor Qp is turned on again, at time t4, to start the next cycle.

The next control cycle starts at time t4, when power transistor Qp is turned on. After a fixed on-time, ton, power transistor Qp is turned off, at time t5. Thus, the self-resonating control cycles repeat in a manner similar to control cycles from time t0 to time t2, and from time t2 to time t4, as described above.

As shown in FIG. 3, current IL is the current in the primary winding Lp. Current IL is characterized by a sawtooth pattern with a peak current determined by the on-time ton as illustrated by waveform 320. The sawtooth pattern has a period determined by the switching control cycle. The LED current is determined by an average of the current IL which, in turn, is determined by the on-time. Therefore, the LED current can be regulated by varying the on-time.

FIG. 4 is a simplified schematic diagram illustrating another self-oscillating converter according to some embodiments of the present invention. As shown in FIG. 4, self-oscillating converter 400 is similar to self-oscillating converters 200 of FIG. 2 and self-oscillating converters 100 of FIG. 1. These converters share many common components. Therefore, functions and operations of common components in FIG. 4 are not described in detail. On the other hand, self-oscillating converter 400 is different from self-oscillating converters 200 of FIG. 2 in two aspects. First, self-oscillating converter 400 is configured as a non-isolated Buck-Boost converter. Second, self-oscillating converter 400 provides an over-voltage protection circuit 425, for example, a latch circuit, as an implementation example of the over-voltage protection circuit 125 in self-oscillating converters 100 of FIG. 1.

As shown in FIG. 4, self-oscillating converter 400 includes a primary winding Lp for coupling to an input voltage Vin and providing a regulated output voltage Vout to a load device 402, and a power transistor Qp coupled to the primary winding Lp for controlling current flow in the primary winding Lp and power transistor Qp. Self-oscillating converter 400 also includes a first auxiliary winding Ld coupled to the primary winding Lp for providing a turn-on signal 412 to a gate node 404 of power transistor Qp for maintaining oscillation in the self-oscillating converter 400. Self-oscillating converter 400 also includes a second auxiliary winding Lc coupled to the primary winding Lp for providing a turn-off signal 422 to the power transistor to maintain an on-time of the power transistor Qp at a pre-set value for power factor correction. Self-oscillating converter 400 also includes a turn-on circuit 410 and a turn-off circuit 420, similar to turn-on circuit 210 and turn-off circuit 220 of FIG. 2, respectively. Self-oscillating converter 400 further includes a sensing circuit 430 for sensing an output current $I_L$ in the load device and providing a modulating signal 432 to modulate the on-time of the power transistor Qp to regulate the output current $I_L$ in the load device.

In the example of FIG. 4, self-oscillating converter 400 is configured as a non-isolated Buck-Boost converter. As shown in FIG. 4, input voltage Vin, power transistor Qp, diode Db, and primary winding Lp are configured to provide output voltage Vout across output capacitor Co. Resistor RL represents the load resistance of load device 402. In the example of FIG. 4, the load device 402 is an LED device.

Self-oscillating converter 400 also includes an over-voltage protection circuit 425. Over-voltage protection circuit 425 in self-oscillating converter 400 is an implementation example of over-voltage protection circuit 125 in self-oscillating converter 100 in FIG. 1. The circuit of over-voltage protection circuit 425 can also be added to self-oscillating converter 200 FIG. 2.

Over-voltage protection circuit 425 provides protection in the event the load device, e.g., the LED, becomes an open circuit. As shown in FIG. 4, over-voltage protection circuit 425 includes a Zener diode Vovp coupled to winding Lc. Zener diode Vovp is also connected in series with a resistor Ro. Over-voltage protection circuit 425 also includes an SCR (silicon-controlled rectifier) formed by bipolar transistors Q1 and Q2 and capacitor CL. The SCR is coupled to a node between Zener diode Vovp. The transistor Q1 of the SCR is also coupled to transistor Qto, which, in turn, is coupled to the gate node 404 of power transistor Qp. In this arrangement, if the SCR is triggered, power transistor Qp is turned off. In this example, the over voltage (OVP) condition results in Qp turning off, overriding other turn off controls. Ideally there will be sufficient holding current to keep Qp off for a relatively long period of time. When the rectified AC voltage nears the valley, there may not be enough holding current to keep the SCR fired and switching may commence again for a short period of time, and if the OVP condition still exists, the SCR will fire again and turn off Qp again. The circuit will not necessarily latch off Qp indefinitely and there may be a cycling on and off of the converter while the OVP condition exists. The Vdd closely reflects the output voltage and fires the SCR when that voltage exceeds Vovp Zener voltage+the Vbe of Q2.

During the off-time of power transistor Qp, LED load voltage is reflected across the second auxiliary winding Lc. If the LED works properly, it clamps the output voltage at the LED voltage Vled. However, if the LED load becomes open, the over-voltage protection circuit 425 is activated to protect the converter, as described below. When the LED load becomes open, the voltage across the Zener diode Vovp is high enough to turn on the Zener diode Vovp, which produces a bias voltage across resistor Ro. This bias voltage then triggers the SCR (silicon-controlled rectifier) formed by bipolar transistors Q1 and Q2 and capacitor CL. As a result, the power transistor Qp is turned off to protect the converter.

In FIGS. 1, 2 and 4, self-oscillating converters 100, 200, and 400 include an over-current protection circuit 127, 227, and 427 that includes a Zener diode Vz. Zener diode Vz offers a worst case over-current protection. As shown in FIG. 2, as a current is drawn through the current sense resistor Rs, the power transistor Qp source voltage at node 205 ramps up, and the gate voltage at gate node 204 also ramps up. Zener diodes Vz function to clamp the gate voltage at gate node 204. If the source voltage at 205 rises due to a high current in sense resistor Rs and reduces the gate-to-source voltage, the power transistor Qp will be shut off.

Figure 5:
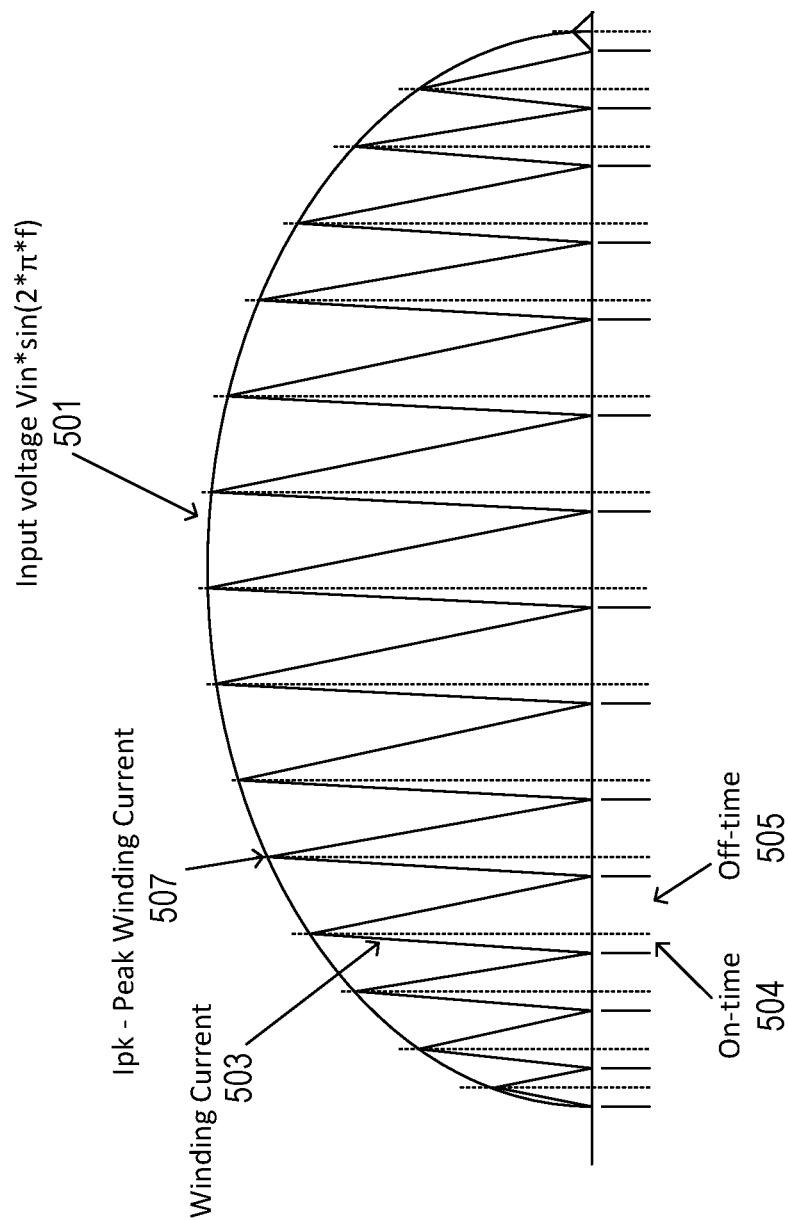
FIG. 5 is a simplified waveform diagram illustrating waveforms of a half cycle of input voltage and currents in the primary winding in a self-oscillating converter according to embodiments of the present invention.

FIG. 5 is a simplified waveform diagram illustrating waveforms of a half cycle of input voltage and currents in the primary winding in a self-oscillating converter according to embodiments of the present invention. In FIG. 5, waveform 501 shows a half cycle of a rectified input voltage Vin, expressed as a sinusoidal function, Vin*sin(2*π*f), where f is the line frequency, e.g., 60 Hz. Waveform 503 shows the current in the primary winding Lp. During the on-time 504, the winding current illustrated by waveform 503 rises as the power transistor is turned on and charges the primary winding Lp. During the off-time 505, the winding current illustrated by waveform 503 drops as the power transistor is turned off and the primary winding Lp discharges into the load device. Waveform 507 shows Ipk, the peak points of the winding current. In some embodiments, the on-time is maintained at a pre-set value, in each cycle of the self-oscillating converter. Under this condition, the peak current Ipk tracks the input voltage Vin, Vin*sin(2*π*f). The peak current can be expressed as Ipk=(Vin*sin(2*π*f))*ton/L, where ton is the turn-on time, and L is the inductance of the primary winding Lp.

Figure 6:
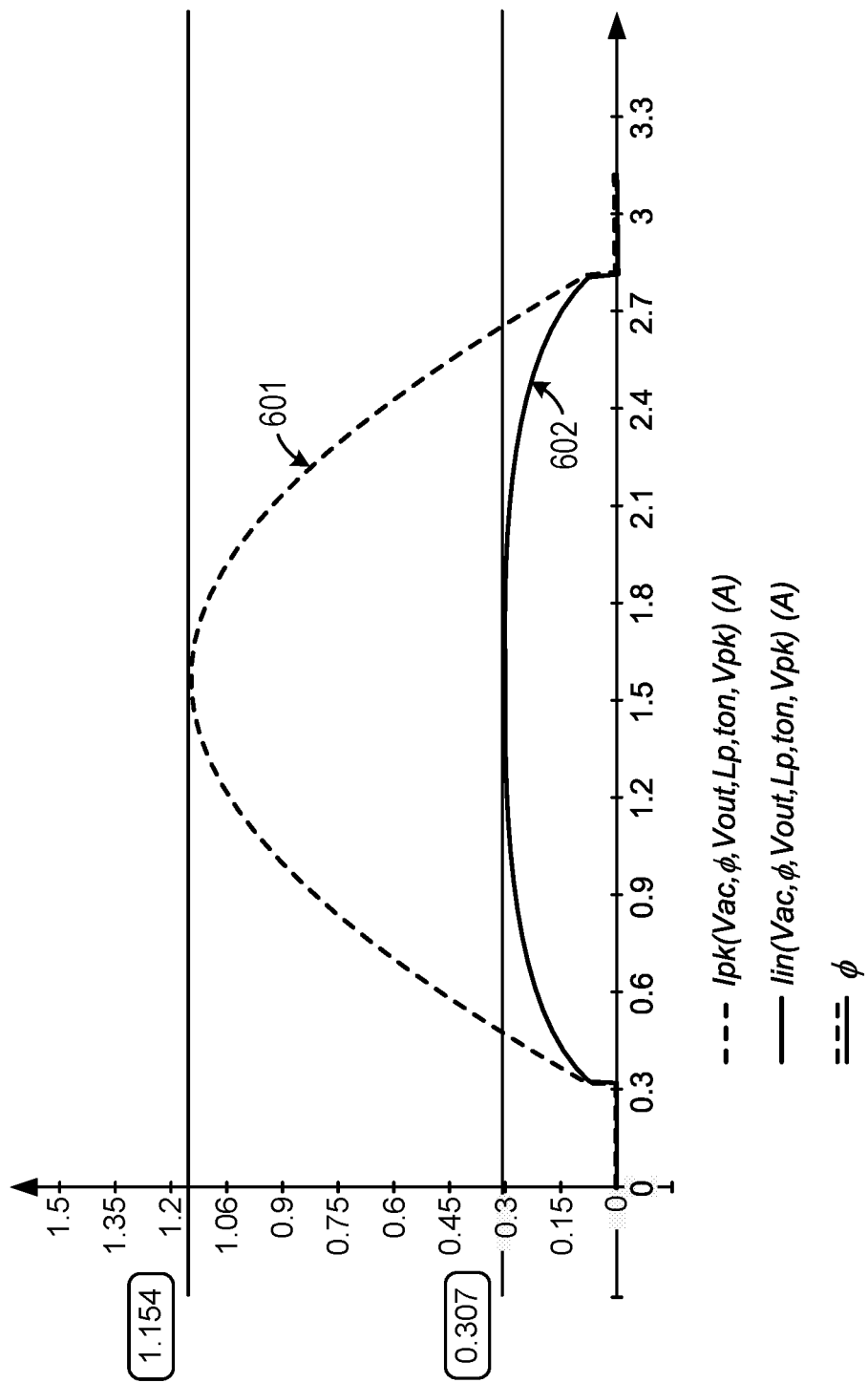
FIG. 6 is a simplified waveform diagram illustrating waveforms of a half cycle of input voltage and average currents in the primary winding in a self-oscillating Buck converter according to embodiments of the present invention.

FIG. 6 is a simplified waveform diagram illustrating waveforms of a half cycle of input voltage and average current in the primary winding in a self-oscillating Buck converter according to embodiments of the present invention. In FIG. 6, waveform 601 shows the envelope of peak winding current Ipk, which tracks the input voltage Vin. Waveform 602 shows the input current Iin provided by the input voltage Vin. It can be seen that, for the Buck converter, the input current Iin is in phase with the input voltage Vin, providing good power factor correction. However, the input current Iin is not necessarily exactly proportional to the input voltage Vin.

Figure 7A:
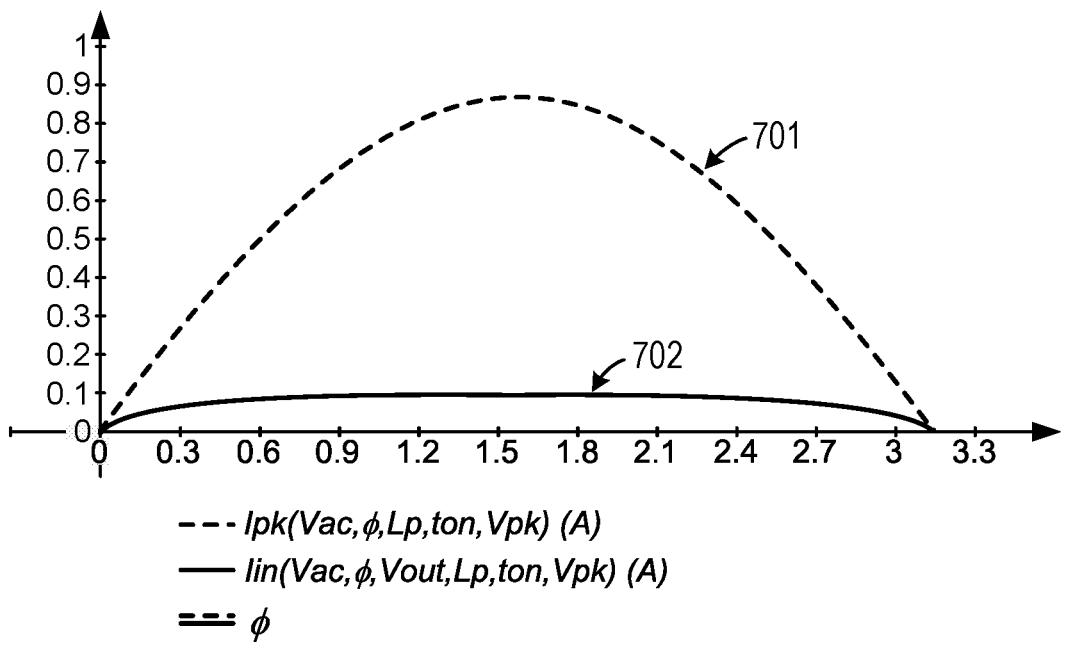
FIGS. 7A and 7B are simplified waveform diagrams illustrating waveforms of a half cycle of input voltage and average currents in the primary winding in a self-oscillating Buck-Boost converter according to embodiments of the present invention.
Figure 7B:
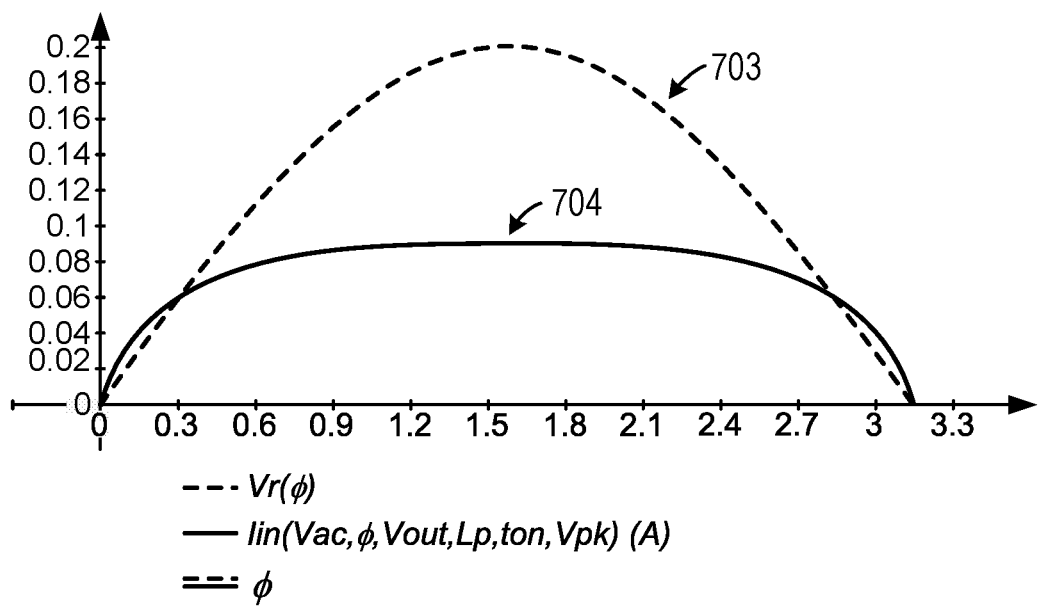

FIGS. 7A and 7B are simplified waveform diagrams illustrating waveforms of a half cycle of input voltage and average current in the primary winding in a constant on-time self-oscillating Buck-Boost converter according to embodiments of the present invention. In FIG. 7A, they axis is in Amperes, and waveform 701 shows the envelope of peak winding current Ipk, which tracks the input sinusoidal line voltage Vin. Waveform 702 shows the input current Iin provided by the input voltage Vin. It can be seen that, for the Buck-Boost converter, the input current conducts throughout the whole line cycle and can provide better power factor correction with less input current total harmonic distortion than the buck version of the converter. In FIG. 7B, waveform 703 represents the sinusoidal shape of the input voltage Vr(φ) for comparison to the shape of the average input current Iin. Waveform 704 shows the input current Iin relative to the input voltage Vin, where φ is the phase angle. Waveform 703 is not to scale and the y axis has units of Amperes for waveform 704 only.

Figure 8:
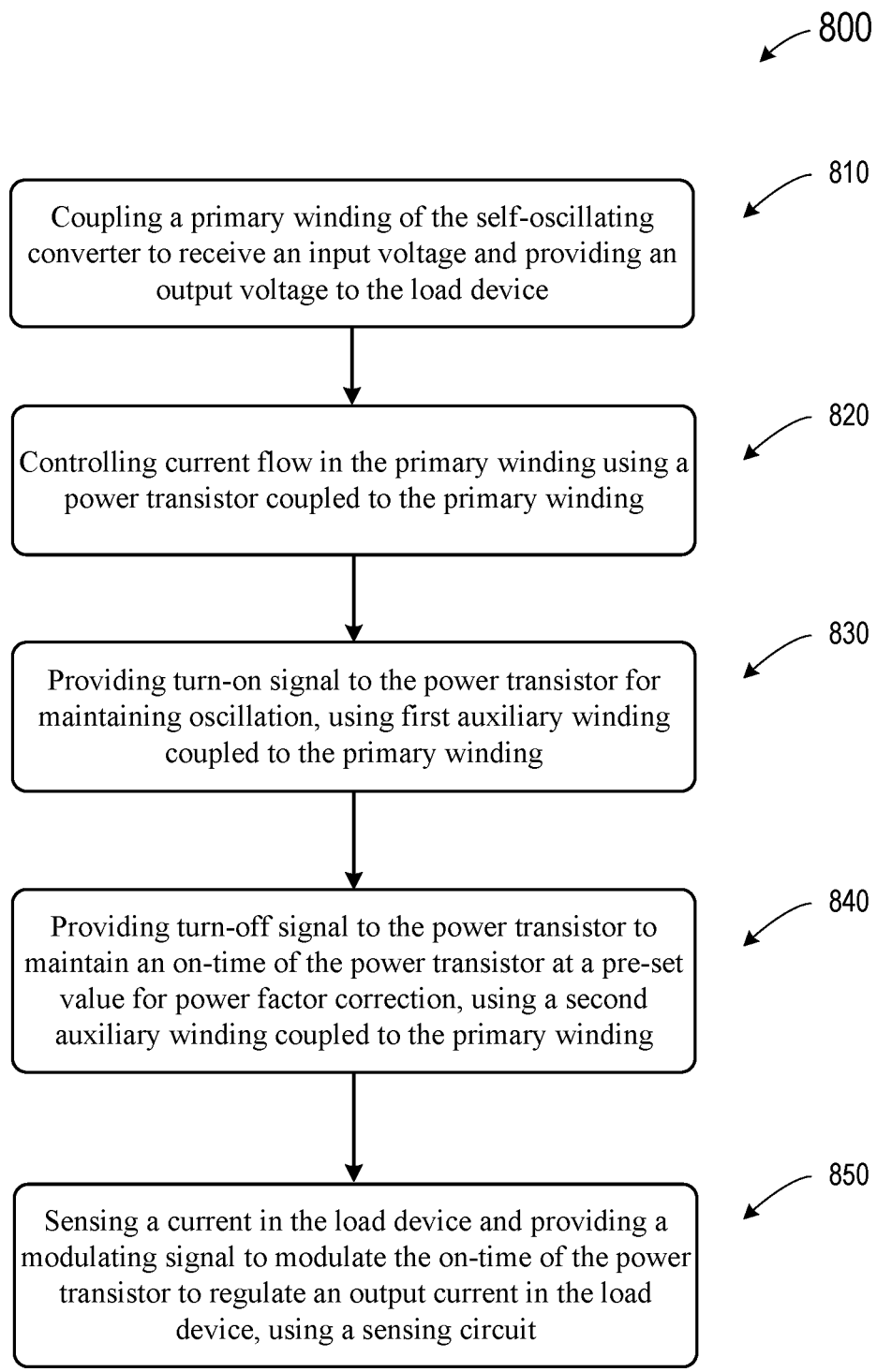
FIG. 8 is a simplified flowchart illustrating a method for driving a load device with a self-oscillating converter.

FIG. 8 is a simplified flowchart illustrating a method for driving a load device with a self-oscillating converter. The method enables a self-oscillating converter to provide power factor correction while regulating the load current accurately without the addition of an integrated circuit controller.

Examples of self-oscillating converters were described above in connection to FIGS. 1-4. For example, FIGS. 1 and 2 illustrate examples of non-isolated self-oscillating Buck converters, and FIG. 4 illustrates an example of a non-isolated self-oscillating Buck-Boost converter. However, the method described here can also be applied to other topologies of non-isolated or isolated converters. For example, the method can also be implemented in an isolated converter in a fly-back topology, in which the output is isolated from the input with a transformer.

As shown in the flowchart in FIG. 8, method 800 can be summarized as follows:

810: Coupling a primary winding of the self-oscillating converter to receive an input voltage and providing an output voltage to the load device;

820: Controlling current flow in the primary winding using a power transistor coupled to the primary winding;

830: Providing a turn-on signal to the power transistor for maintaining oscillation in the self-oscillating converter, using a first auxiliary winding coupled to the primary winding;

840: Providing a turn-off signal to the power transistor to maintain an on-time of the power transistor at a pre-set value for power factor correction, using a second auxiliary winding coupled to the primary winding; and 850: Sensing a current in the load device and providing a modulating signal to modulate the on-time of the power transistor to regulate an output current in the load device, using a sensing circuit.

Each of the above processes are further described below with reference to self-oscillating converter 200 of FIG. 2. At 810, the method includes coupling a primary winding of the self-oscillating converter to receive an input voltage and providing an output voltage to the load device. As shown in FIG. 2, self-oscillating converter 200 includes a primary winding Lp for coupling to an input voltage Vin and providing a regulated output voltage Vout to a load device 202.

In some embodiments, the method includes configuring the self-oscillating converter as a non-isolated Buck converter. Alternatively, in some embodiments, the method includes configuring the self-oscillating converter as a non-isolated Buck-Boost converter. In other embodiments, the method can include configuring the self-oscillating converter as an isolated switch mode power converter.

In some embodiments, the load device comprises an LED (light-emitting diode) device. Examples of the LED load devices are described above. However, it is understood that other types of load devices can also be used.

At 820, the method includes using a power transistor coupled to the primary winding to control the current flow in the primary winding. As shown in FIG. 2, self-oscillating converter 200 includes a power transistor Qp coupled to the primary winding Lp for controlling current flow in the primary winding Lp using power transistor Qp.

In some embodiments, the power transistor comprises a gallium nitride (GaN) JFET (Junction Field Effect Transistor). In alternative embodiments, other types of transistors, such as MOS transistors, can be used. In some embodiments, switches made in other types of semiconductors, such as silicon, can also be used.

At 830, a turn-on signal is provided to the power transistor for maintaining oscillation in the self-oscillating converter, using a first auxiliary winding coupled to the primary winding. As shown in FIG. 2, self-oscillating converter 200 also includes a first auxiliary winding Ld coupled to the primary winding Lp for providing a turn-on signal 212 to the power transistor Qp for maintaining oscillation in the self-oscillating converter 200.

In some embodiments, the method further includes providing the turn-on signal using a turn-on circuit coupled between the first auxiliary winding and the power transistor and configured to provide the turn-on signal, wherein the turn-on circuit comprises a first branch and a second branch connected in series, the first branch including a first resistor and a capacitor connected in series, and the second branch including a diode and a second resistor connected in series.

At 840, a turn-off signal is provided to the power transistor to maintain an on-time of the power transistor at a pre-set value for power factor correction, using a second auxiliary winding coupled to the primary winding. As shown in FIG. 2, self-oscillating converter 200 also includes a second auxiliary winding Lc coupled to the primary winding Lp for providing a turn-off signal 221 to the power transistor to maintain an on-time of the power transistor Qp at a pre-set value for power factor correction.

In some embodiments, the method further includes providing the turn-off signal using a turn-off circuit coupled between the second auxiliary winding and the power transistor, wherein the turn-off circuit comprises a ramp circuit coupled to the second auxiliary winding for providing the turn-off signal to the power transistor to maintain the on-time of the power transistor at the pre-set value.

In some embodiments, the method further includes forming the ramp circuit in the turn-off circuit with a first resistor and a charging capacitor coupled in series to the second auxiliary winding to provide a first charging current to maintain the on-time of the power transistor at the pre-set value.

At 850, the method includes sensing a current in the load device and providing a modulating signal to modulate the on-time of the power transistor to regulate an output current in the load device, using a sensing circuit. As shown in FIG. 2, self-oscillating converter 200 further includes a sensing circuit 230 for sensing an output current $I_L$ in the load device and providing a modulating signal 232 to modulate the on-time of the power transistor Qp to regulate the output current $I_L$ in the load device.

In some embodiments, the sensing circuit includes an error amplifier characterized by a bandwidth substantially lower than the frequency of the input voltage. As described above in connection with FIGS. 1-4, output current regulation is accomplished by sensing the output current, comparing the sensed signal with a reference signal, and modulating the on-time ramp circuit in the turn-off circuit 220.

In order to verify the design, prototype circuits were made, and test results show a measured power factor from 0.95 to 0.97 with typical LED current line regulation error less than 1%. Switching frequencies ranging from 800 kHz to 1.2 MHz and higher are also achieved with GaN power devices.

Embodiments of the invention were described above using examples of non-isolated Buck converters and Buck-Boost converters. However, it is understood that the invention can be implemented with other types of switch mode power supplies, for example, a flyback and boost converter can also be implemented.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A self-oscillating converter with power factor correction and output current regulation, the self-oscillating converter comprising:
    a primary winding for coupling to an input voltage and providing a regulated output voltage to a load device;
    a power transistor coupled to the primary winding for controlling current flow in the primary winding;
    a first auxiliary winding coupled to the primary winding for providing a turn-on signal to the power transistor for maintaining oscillation in the self-oscillating converter;
    a second auxiliary winding coupled to the primary winding for providing a turn-off signal to the power transistor to maintain an on-time of the power transistor at a pre-set value for power factor correction; and
    a sensing circuit for sensing an output current in the load device and providing a modulating signal to modulate the on-time of the power transistor to regulate the output current in the load device.

2. The self-oscillating converter of claim 1, further comprising a turn-off circuit coupled between the second auxiliary winding and the power transistor and configured to provide the turn-off signal, wherein the turn-off circuit comprises a ramp circuit coupled to the second auxiliary winding for providing the turn-off signal to the power transistor to maintain the on-time of the power transistor at the pre-set value.

3. The self-oscillating converter of claim 2, wherein the ramp circuit in the turn-off circuit comprises a first resistor and a charging capacitor coupled in series to the second auxiliary winding to provide a first charging current to maintain the on-time of the power transistor at the pre-set value.

4. The self-oscillating converter of claim 3, wherein the modulating signal from the sensing circuit activates a second charging current to the ramp circuit to modulate the on-time of the power transistor to regulate the output current in the load device.

5. The self-oscillating converter of claim 1, further comprising a turn-on circuit coupled between the first auxiliary winding and the power transistor and configured to provide the turn-on signal, wherein the turn-on circuit comprises a first branch and a second branch connected in series, the first branch including a first resistor and a capacitor connected in series, and the second branch including a diode and a second resistor connected in series.

6. The self-oscillating converter of claim 1, wherein the self-oscillating converter is a non-isolated Buck converter.

7. The self-oscillating converter of claim 1, wherein the self-oscillating converter is a non-isolated Buck-Boost converter.

8. The self-oscillating converter of claim 1, wherein the self-oscillating converter is an isolated switch mode power converter.

9. The self-oscillating converter of claim 1, wherein the sensing circuit comprises an error amplifier characterized by a bandwidth substantially lower than a frequency of an AC input voltage.

10. The self-oscillating converter of claim 9, wherein the AC input voltage is a 60 Hz signal, and the bandwidth of the error amplifier is approximately 2 to 3 Hz.

11. The self-oscillating converter of claim 1, wherein the load device comprises a light-emitting diode (LED) device.

12. The self-oscillating converter of claim 1, further comprising an over-current protection circuit, wherein the over-current protection circuit is coupled between a gate node of the power transistor and a ground node.

13. The self-oscillating converter of claim 1, wherein the power transistor comprises a JFET (Junction Field Effect Transistor).

14. The self-oscillating converter of claim 1, wherein the power transistor comprises a gallium nitride (GaN) transistor.

15. A method for driving a load device with a self-oscillating converter, comprising:
coupling a primary winding of the self-oscillating converter to receive an AC input voltage and providing an output voltage to the load device;
controlling current flow in the primary winding using a power transistor coupled to the primary winding;
providing a turn-on signal to the power transistor for maintaining oscillation in the self-oscillating converter, using a first auxiliary winding coupled to the primary winding;
providing a turn-off signal to the power transistor to maintain an on-time of the power transistor at a pre-set value for power factor correction, using a second auxiliary winding coupled to the primary winding; and
sensing a current in the load device and providing a modulating signal to modulate the on-time of the power transistor to regulate an output current in the load device, using a sensing circuit.

16. The method of claim 15, further comprising providing the turn-off signal using a turn-off circuit coupled between the second auxiliary winding and the power transistor, wherein the turn-off circuit comprises a ramp circuit coupled to the second auxiliary winding for providing the turn-off signal to the power transistor to maintain the on-time of the power transistor at the pre-set value.

17. The method of claim 16, further comprising forming the ramp circuit in the turn-off circuit with a first resistor and a charging capacitor coupled in series to the second auxiliary winding to provide a first charging current to maintain the on-time of the power transistor at the pre-set value.

18. The method of claim 17, further comprising using the modulating signal from the sensing circuit to activate a second charging current to the ramp circuit to modulate the on-time of the power transistor to regulate the output current in the load device.

19. The method of claim 15, further comprising providing the turn-on signal using a turn-on circuit coupled between the first auxiliary winding and the power transistor and configured to provide the turn-on signal, wherein the turn-on circuit comprises a first branch and a second branch connected in series, the first branch including a first resistor and a capacitor connected in series, and the second branch including a diode and a second resistor connected in series.

20. The method of claim 15, wherein the sensing circuit comprises an error amplifier characterized by a bandwidth substantially lower than a frequency of the AC input voltage.

* * * * *